Figure 1:
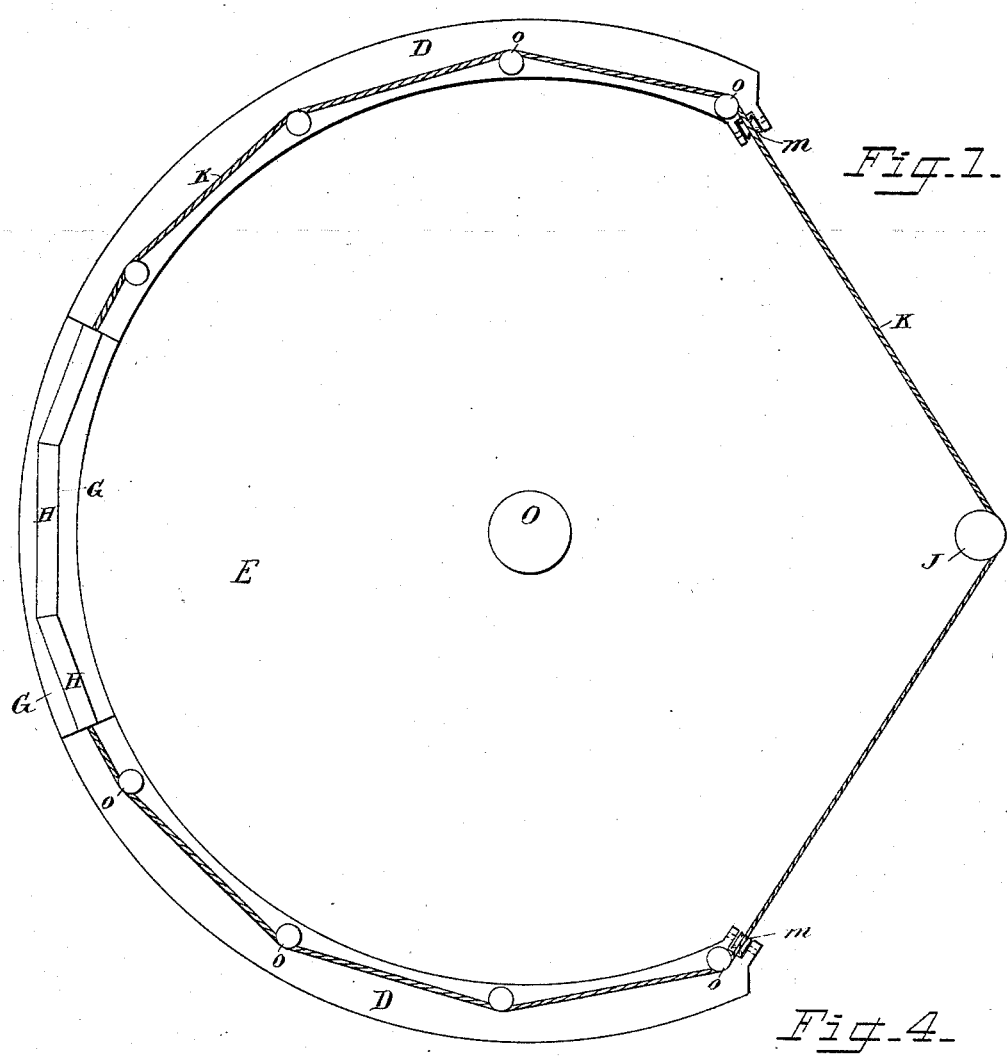

(No Model.)　　　　　　　　　H. E. PAINE.　　　　　　6 Sheets—Sheet 2.
SOLAR HEATER.
No. 509,393.　　　　　　　　　　　　　Patented Nov. 28, 1893.

Attest:
Wm. Meister
Niell S. Brown

Halbert E. Paine Inventor:
By Paine and Ladd
Attys.

(No Model.)  6 Sheets—Sheet 3.

H. E. PAINE.
SOLAR HEATER.

No. 509,393. Patented Nov. 28, 1893.

Attest:
J. H. Hister
Neill S. Brown

Halbert E. Paine Inventor:
By
Paine and Ladd
Attys.

(No Model.) 6 Sheets—Sheet 4.
H. E. PAINE.
SOLAR HEATER.
No. 509,393. Patented Nov. 28, 1893.
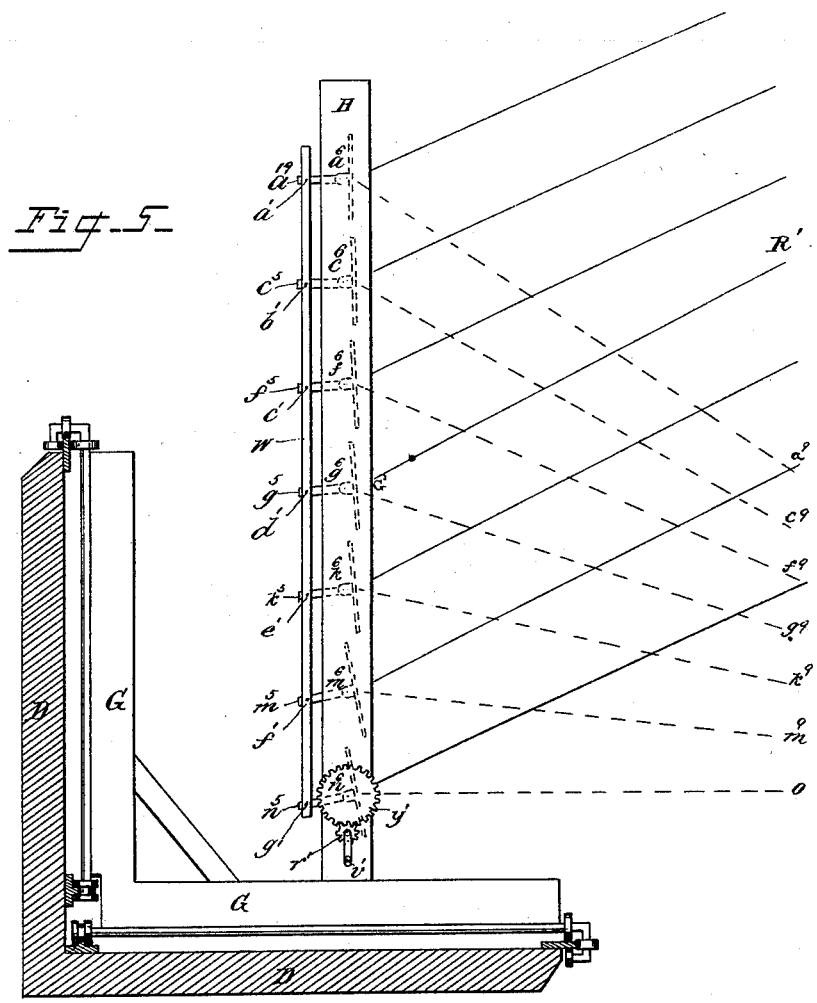

(No Model.)  H. E. PAINE.  6 Sheets—Sheet 5.
SOLAR HEATER.

No. 509,393.  Patented Nov. 28, 1893.

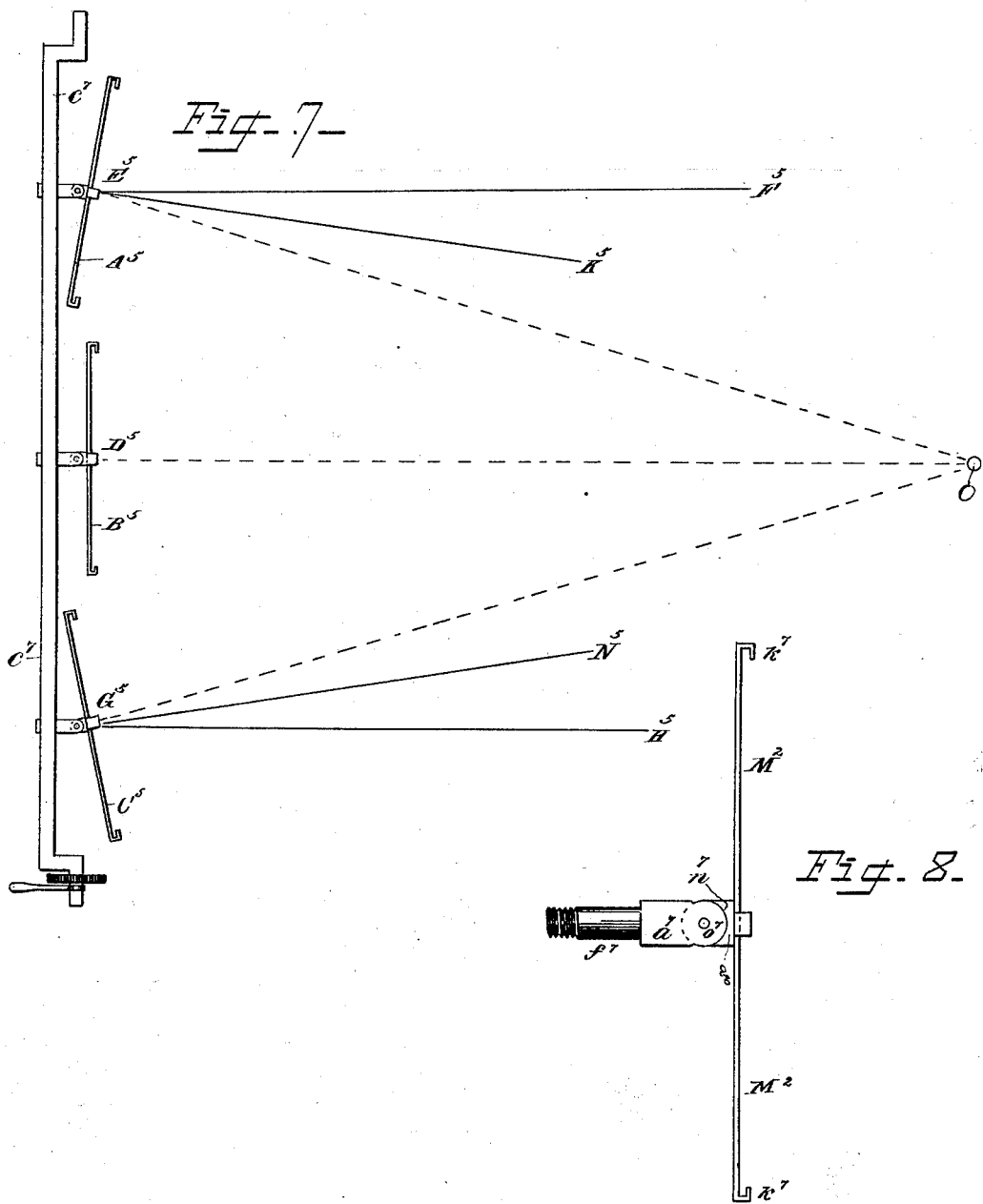

UNITED STATES PATENT OFFICE.

HALBERT E. PAINE, OF WASHINGTON, DISTRICT OF COLUMBIA.

SOLAR HEATER.

SPECIFICATION forming part of Letters Patent No. 509,393, dated November 28, 1893.

Application filed March 15, 1893. Serial No. 466,070. (No model.)

*To all whom it may concern:*

Be it known that I, HALBERT E. PAINE, a citizen of the United States, residing at Washington, in the District of Columbia, have invented certain new and useful Improvements in Solar Heaters; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

For the production of a high degree of solar heat groups of small plane mirrors, all so adjusted as to reflect images of the sun upon the same place or field, for short periods of time, have heretofore been used. There is a tradition that such an assemblage of mirrors was used by Archimedes, to burn the Roman fleet, at Syracuse, in the year 212 B. C., and afterward by Proclus, to burn the Gothic fleet, at Constantinople, A. D. 514; and in modern times experiments have been tried looking to the practical utilization of solar heat, and Letters Patent have been granted for various improvements in the art; but in all cases mentioned in history, whether ancient or modern, or in descriptions of experiments, or in Letters-Patent, wherever groups of mirrors have been used to concentrate solar heat, by a number of superimposed reflections, the mirrors have been either separate, or supported in stationary frames without means for effecting their simultaneous change of inclination, or arranged to move around the heat-receiver in a horizontal or proximately horizontal plane. Solar heaters of these classes are to be distinguished from those in which are employed stationary parabolic or conical reflecting surfaces, casting single condensed reflections, or concave reflecting surfaces revolving about heat-receivers and casting single condensed reflections thereon. Solar heaters of the three first mentioned classes operate by the superposition of several uncondensed reflections, from separate plane mirrors, upon a common field or surface, the separate mirrors not being necessarily grouped or arranged in any prescribed form; while in the case of solar heaters of the latter class the reflecting surface, as a whole, casts a single condensed reflection on the heat-receiver. In solar heaters of the first three classes, it has been difficult to secure regular and continuous action because of the complex motions, or adjustments, required for each reflector, to maintain its proper position with respect to the sun and the heat-receiver. One great difficulty, encountered in the case of groups of mirrors moving around the heat receiver, has resulted from the fact that they have revolved in a horizontal, or proximately horizontal, plane, and the object of the present invention is to overcome this difficulty and simplify the working of solar heaters consisting of groups of plane mirrors. This is accomplished by mounting the frame of the mirrors in a plane perpendicular to the proximate plane of the sun's apparent diurnal revolution around the earth, and, also perpendicular to the vertical plane passing through the sun and bisecting the frame, the reflectors having a rotary movement in a plane parallel with the proximate plane of the sun's apparent diurnal motion around the earth, the heat receiver being placed at a point in a line passing through the center of the circle in which the reflectors travel, and perpendicular to the proximate plane of the sun's apparent diurnal movement around the earth. Under this arrangement, when the several reflectors are once so adjusted as to cast all their reflections, at a given instant of time, upon the same spot or field, no subsequent adjustment of the reflectors is required, without accidental disarrangement, except a slight movement each day on their horizontal axes, to adjust them to the slight daily changes occurring in the altitude of the sun, as it moves to and fro between the tropics. It will be observed that, as the circular movement of the group of reflectors, about the heat-receiver is made, practically, in a plane parallel to that of the equator and inclined to that of the horizon, with the middle of the curved track at the lowest point, the reflectors have a descending movement, during the forenoon, and an ascending movement, during the afternoon.

The invention includes means of counterbalancing the weight of the car of reflectors, during its descending movement, and raising it, during its upward course, with mechanism for controlling the motion of the car, together with several subordinate and auxiliary devices, all of which will be fully described, in the specification, and pointed out in the claims.

Figure 2:
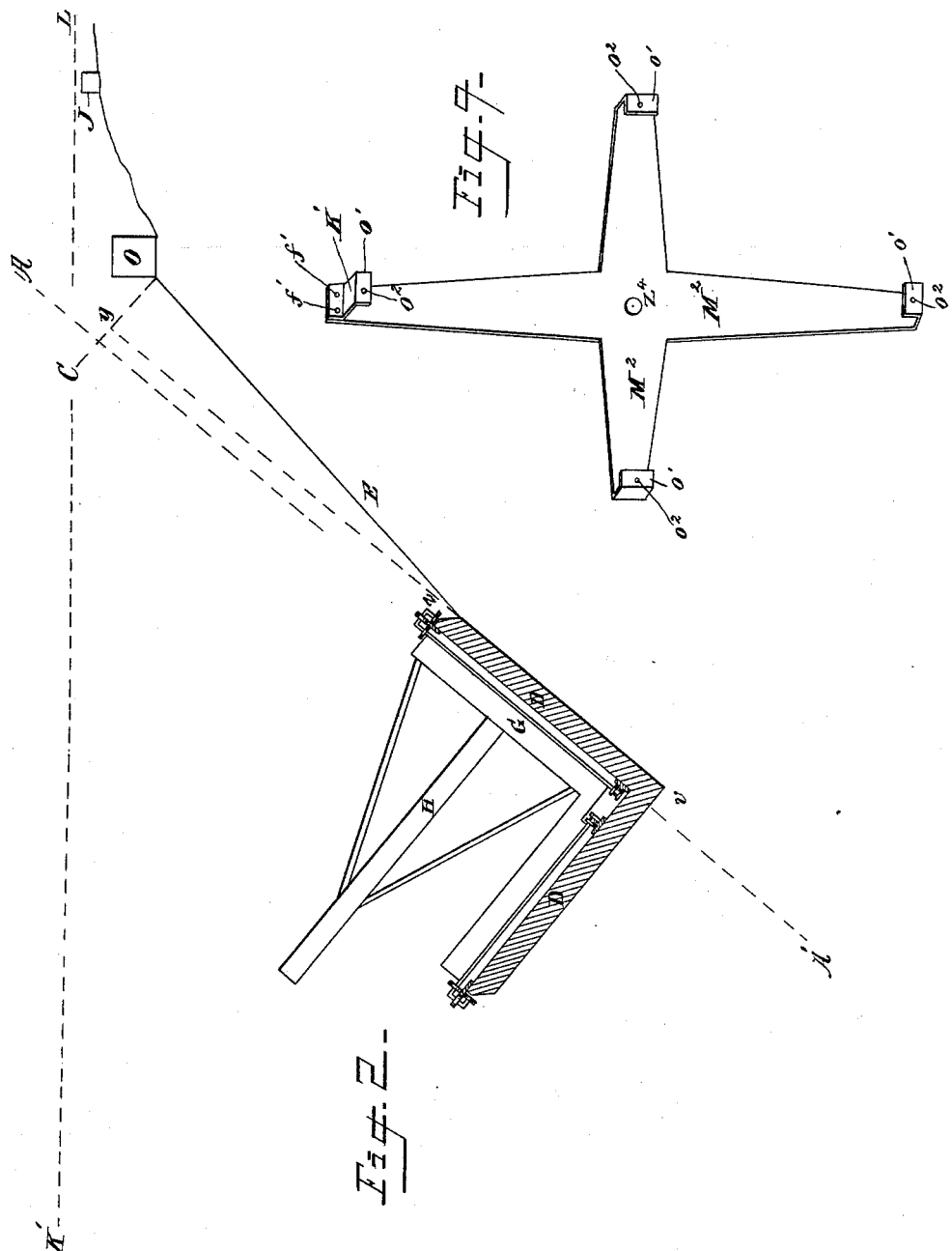
Figure 3:
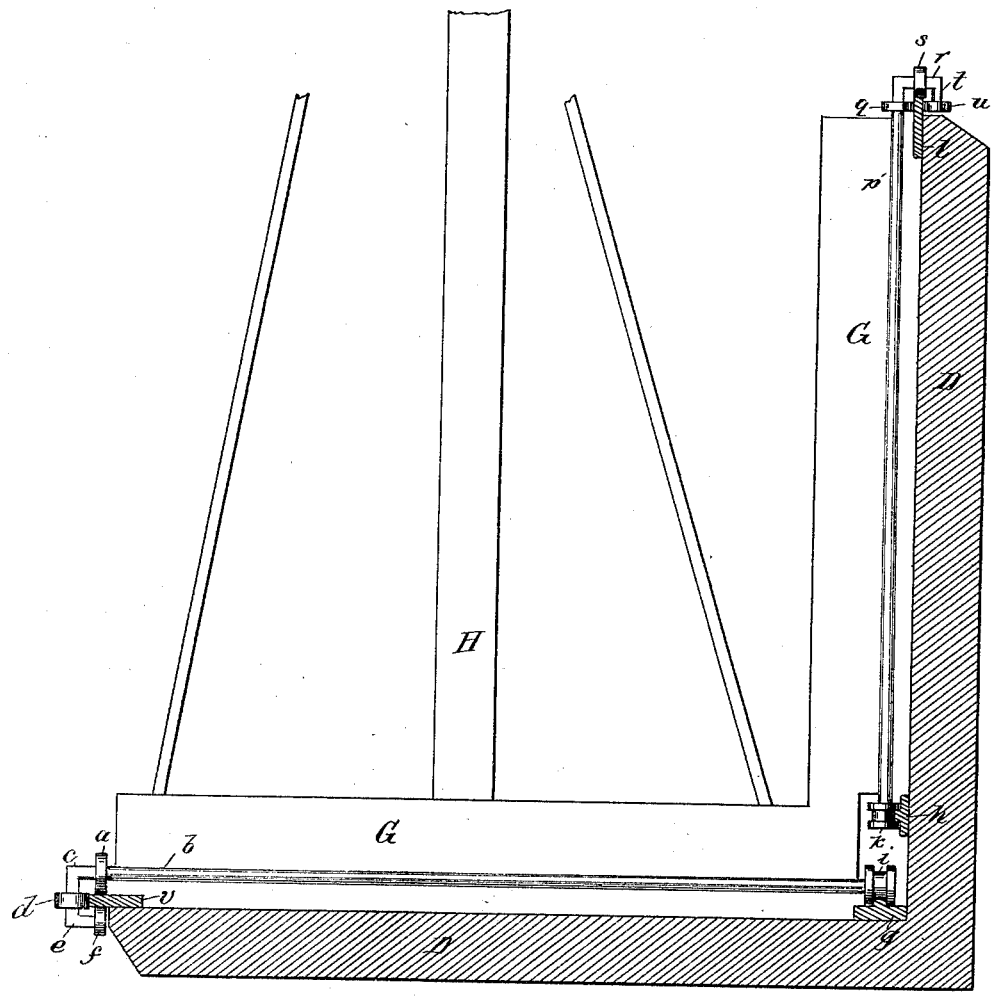
Figure 6:
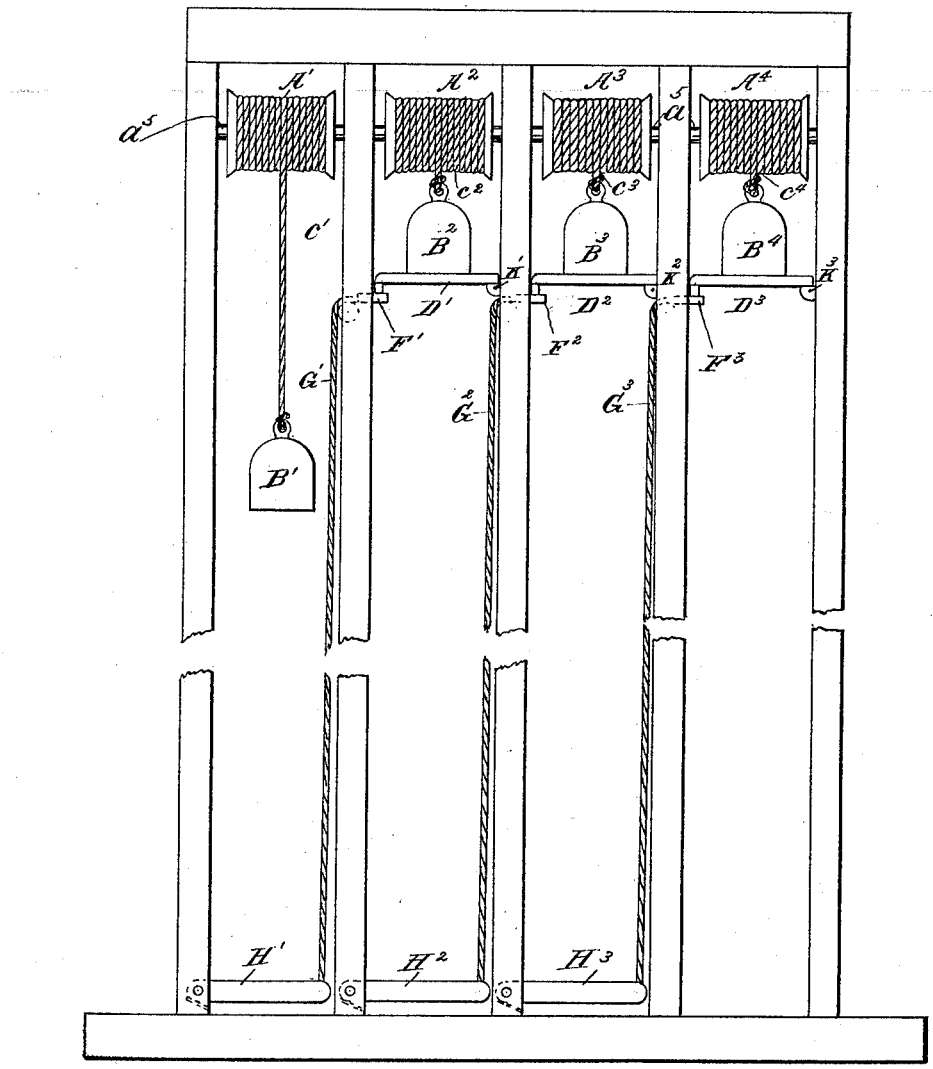

Figure 1, represents the track, located in the proximate plane of the sun's apparent diurnal revolution around the earth, showing the mirror-car at the middle of the arc of rotation, and due north or south from the heat-receiver, which is located at or near the center of the arc of revolution. Fig. 2 represents the mirror-car, seen from the rear in the northern hemisphere, and from the front in the southern hemisphere, in position on the track at the middle of the arc of revolution, one part of the track being in the proximate plane of the sun's apparent diurnal motion around the earth, and the other part perpendicular thereto, the horizon being shown by the line K' L, and the heat-receiver located at O. Fig. 3 represents an enlarged view of the mirror-frame, seen from the front in the northern hemisphere and from the rear in the southern hemisphere, the car being in position on the track at the middle of the arc of revolution. Fig. 4 represents one of the two counterpoise-cars. Fig. 5 represents the mirror-car, with the adjusting device which changes the vertical inclination of the mirrors. Fig. 6 represents the clock-work. Fig. 7 is a diagram illustrating the relations between the horizontal angular movement of the sun and that of the mirrors. Fig. 8 represents a top view of one of the studs, with the mirror pivoted thereto. Fig. 9 is a mirror-holder.

In Fig. 1 of the drawings, D is the track in section; E the graded slope, from the track to the heat-receiver; G the car bearing the mirrors; H the mirror-frame, straight or broken; J the windlass, or drum, which drives the cable; K the cable, which moves the car; O the heat-receiver; $m, m, o, j$, drums, around which the cable K moves.

In Fig. 2, A A' is the proximate plane of the sun's apparent diurnal movement around the earth; O the heat-receiver near the center of the circle of rotation, C O a line perpendicular to the proximate plane of the sun's apparent motion around the earth; E the graded contour of the ground on the line from the car to the heat-receiver; G G parts of the car rigidly connected together at right angles, the wheels moving on the track D; H the mirror-frame at right angles with A A'; J the windlass, or drum, driving the cable; $z\,y$ the graded plane of the track; and K' L the horizon.

In Fig. 3, which represents the car seen from the front, D is the track in section; G the platform of the car; and H the mirror-frame. The axle $b$, on which the wheel $a$, revolves, as it moves on the rail $v$, is rigidly joined at right angles, to the axle $c$, on which the wheel $d$ revolves. This wheel $d$ moves on the inner edge of the rail $v$, to prevent a lateral movement of the car. The axle $c$ is rigidly connected, at right angles, with the axle $c$ on which the wheel $f$ revolves. The wheel $f$ moves on the lower side of the projecting rail $v$, so as to keep the wheel $a$ in its proper position on the upper side of the projecting rail. The axle $p$ on which the wheel $q$ revolves, as it moves on the projecting rail $l$, is rigidly connected, at right angles, with the axle $r$, on which the wheel $s$ revolves. The wheel $s$ moves on the edge of the projecting rail $l$. The axle $r$, is rigidly connected, at right angles, with the axle $t$, on which the wheel $u$ revolves. The wheels $i, k$, move on the rails $g$, $h$, respectively.

In Fig. 4, D is the track; F' F' are wheels one being cut away to show other parts; B' is the platform parallel with the track D; C' the platform at right angles with the track D; K the cable; $z'$ the spring pressing against the lock-bar $x$; $x'$ the lock-bar in the position which it takes when the shoulder $w'$ is locked with the detent R; R the detent on the track, to hold the car stationary; $w'$ a shoulder or projection on the lock-bar $x'$ to engage the detent R; L' a ball on the cable to open the passage between P and $x'$; M' a forked hook, engaging the ball L'. The counterpoise car, which starts from the most northerly point of the track in section, is not provided with a hook M'. The lock-bar $x'$ is tripped, at the terminus of its arc of rotation, by a tripping bar of any convenient form, and this car is released from the cable; and immediately thereafter the spring $z'$ locks the lock-bar $x'$ with a detent corresponding to R, the projection or shoulder of the lock-bar being in front of the detent so as to prevent a backward movement of the car.

In Fig. 5, the position of the sun being in the prolongation of $G^3 R'$ its rays fall upon the center of the central mirror at $g^6$. The arms $a^{19}, c^5, f^5$, &c., are rigidly attached to the axes $a^6, c^6, f^6$, &c., and pivoted at $a', b', c'$, &c., to the rod W. The heat-receiver is on the prolongation of $n^6$ O. The lines $a^6\,a^9, c^6\,c^9$, &c., represent the sun's rays reflected upon the heat-receiver. The wheel $y'$ is a gear-wheel actuated by a pinion $r'$ and crank $v'$. The crank lever $n^5$, rigidly connected with the wheel $y'$, raises and lowers the rod W and changes uniformly the inclination of the mirrors. The rays of the sun, falling on the several mirrors at the same instant, are all parallel. In this figure D represents the track and G the car.

In Fig. 6, A', A², A³, A⁴, represent the barrels or drums, all rigidly attached, by ratchet connections, to a common axis $a^5$. Upon these barrels are wound the cords $c', c^2, c^3, c^4$, by which are suspended the weights, B', B², B³, B⁴. D', D², D³ are movable supports of the weights hinged at K', K², K³, and supported, at the opposite extremities, by the horizontal sliding detents F', F², F³, which detents are attached to the cord G', G², G³.

In Fig. 7, O represents the heat-receiver. For convenience the horizontal tier of mirrors is represented as containing only three mirrors, $A^5$, $B^5$, $C^5$. $O\ D^5$ is in the vertical plane passing through the sun, and cutting the central mirror, at right angles, through the middle. $O\ D^5$ also represents the vertical plane of incidence of the sun's rays upon the central mirror, and the vertical plane of reflection from the central mirror upon the heat receiver. The lines $E^5\ F^5$ and $G^5\ H^5$ represent the rays of the sun, parallel to $O\ D^5$, falling upon the other mirrors at $E^5$ and $G^5$. $O\ E^5$ and $O\ G^5$ represent the vertical planes which must be made the planes of reflection from the mirrors $A^5$ and $C^5$, respectively, upon the heat-receiver O. The planes represented by $E^5\ K^5$ and $G^5\ N^5$ bisect the angles $O\ E^5\ F^5$ and $O\ G^5\ H^5$, respectively. The mirrors $A^5$ and $C^5$ are made perpendicular to those bisecting lines. The mirrors are then in such position that the angle made by the vertical plane of incidence with each mirror is equal to the angle made by the vertical plane of reflection.

Fig. 8, is an enlarged representation of one of the studs to which the mirror-holders are pivoted. The main part of this stud, marked $a^7$, is held fast against the bent rod, marked $c^7$, in Fig. 7, by a nut on the extremity of $f^7$. The parts marked $M^2$, represent two of the four arms of the cross or holder which supports the mirror case. The mirror-case is an envelope made of tin, brass, or other suitable material hermetically sealed, covering the back and a narrow margin of the front of the mirror. The cross, has at the extremities of three of its arms, hooks, or clasps, $k^7$, $k^7$, which embrace the mirror-case. The hook, or clasp, on the extremity of the upper one of the four arms is movable. It is removed to admit the mirror-case to its place, and is then made fast to its arm, by a screw. The curved line $n^7$ is the front edge of the main part of the stud. The curved dotted line $o^7$ is the rear edge of the tongue $a^9$.

The adjusting device, shown in Fig. 8 of the drawings, is also shown in Fig. 7 of the drawings of my application for Letters Patent, filed March 15, 1893, (Serial No. 466,069). It is not claimed, in this application, or in that, as a distinct invention, but only as an element of combinations described as including such adjusting device.

In Fig. 9, $M^2$ represents the four arms of the cross which constitute the mirror-case-holder. All the clasps at the extremities of these arms, except $K'$ are immovably attached to the arm. The clasp $K'$ is made removable, so as to admit the mirror-case to its place in the holder. It is then fastened to the arm by the screws $f'\ f'$. Thumb screws are inserted in the screw-holes $o^2$, $o^2$, and also counter-acting screws in the back of the arms, which latter screws are not shown in the drawings. These screws and counter-acting screws are used to correct inaccuracies of workmanship, in the manufacture of the holder, and of the stud shown in Fig. 8. At $z^4$ the holder is bolted to the part $n^7$ shown in Fig. 8.

The mirror-holder, represented in Fig. 9 of the drawings, is also represented in Figs. 6 and 7 of the drawings of my application, filed March 15, 1893, (Serial No. 466,069;) but in that application it is only claimed as an element of the combinations described as including said mirror-holder; nor is it claimed, although partially described, in my application for Letters Patent, filed March 15, 1893, (Serial No. 466,068.)

In the present case the track, for the car bearing the group of mirrors, is represented as constructed on a hill-side; and, when the mill, smelter, factory or other seat of operations, is located north of the equator, it will be desirable, if convenient, to select a site on the north slope of a hill having an inclination to the horizon about equal to the angle which the proximate plane of the sun's apparent diurnal motion around the earth makes, at that point, with the plane of the horizon. For example, the latitude of Washington, being thirty-eight degrees fifty-three minutes thirty-nine seconds, this angle at this place is fifty-one degrees, six minutes twenty-one seconds, being equal to ninety degrees less the latitude of the place. On the hill-side a bed is graded for the track D, in the arc of a circle and on a plane parallel to the proximate plane of the sun's apparent diurnal movement around the earth, the radius of the track being equal to the predetermined distance of the central reflector from the heat-receiver. If, however, the character of the surface is such that it cannot be conveniently graded for the track, the track may be placed upon timbers, or stone, or be otherwise supported in the proper plane and arc. If the seat of operations is on ground nearly level, it will be necessary either to excavate a foundation for the track, or to construct it wholly above ground on a suitable foundation, or to construct it partly upon an excavated foundation and partly upon a foundation elevated above the surface. At all points north of the equator the plane of the track slopes toward the north, and at all points south of the equator it slopes to the south. At points on the equator the car and mirrors may be north and the heat-receiver south of the plane of rotation, or vice versa.

In the practice of my invention, I provide a track D, resting upon a graded plane $v\ z;$ and at or near the center of a circle of which the track is a segment or arc is located the heat-receiver O. The number of degrees in the arc of the track is equal to the number of degrees in the arc of the horizon included between the points where the sun rises and sets at the seat of operation at the summer solstice.

G is a car traveling on the track D and bearing the reflectors suitably arranged in frames H, the car being moved by a cable K encompassing pulleys $m$, $n$, $o$, supported on the track D, and driven by a windlass, or drum J, suitably disposed for that purpose.

The line A A' indicates the proximate plane of the sun's apparent diurnal movement around the earth, C being in the center of the circle of rotation, and C O a line perpendicular to its plane.

The car G is suitably mounted and held in position on the track by sixteen or more wheels, eight at each end. One series, comprising three wheels $a$, $d$, $f$, is arranged at one end of the horizontal axle $b$, and a fourth wheel $i$, with two flanges, is attached to the opposite extremity of the horizontal axle, its flanges inclosing the rail on which it moves. These four wheels are arranged upon a common shaft, $b$, secured to the under side of the platform or part of the car which is parallel to the plane of the track; another series of three wheels $q$, $s$, $u$, is arranged at the upper end of the axle $p$, and another wheel $k$, like the wheel $i$, is attached to the lower end of the axle $p$, these last four wheels being also carried upon a common axle or shaft $p$ secured to the platform or part of the car which is perpendicular to the plane of the track.

The wheels $a$ and $f$ travel upon the upper and lower sides, respectively, of a projecting rail $v$ of the car, while the wheel $d$ travels upon the outer edge of said rail.

The wheel $i$, runs upon a rail $g$, its flanges inclosing the rail, which is secured to that part of the track D which is in the plane parallel to the proximate plane of the sun's apparent diurnal revolution around the earth. The series of wheels, $q$, $u$, $s$, travel upon the projecting rail $l$ of the other part of the car, having the same relation thereto which the wheels $a$, $d$, $f$, have to the rail $v$, and the wheel $k$, like the wheel $i$, runs upon a rail $h$, similar to $g$, secured near the lower edge of this part of the car. In like manner eight wheels are attached to the two axes at the other end of the car. Other similar series of wheels may be used, at intermediate points, if required. Any other equivalent means may be used to hold the car to the track.

Fig. 4 is a counter-poise car upon the under side of which is a lock-bar $x'$, having a lateral shoulder $w'$ adapted to engage a detent or stop R, on the front forward side of the detent, to prevent backward movements of the car. The lock-bar $x'$ is held in engagement with the detent, by the action of a spring $z'$ secured to the under side of the car and pressing, at its free extremity, upon the rear part of the lock-bar.

The cable K carries a ball L' to act upon and trip the lock-bar, when the latter is to be disengaged from the detent, the ball after tripping the lock-bar, being engaged by a bifurcated hook M' depending from the outer side of the car.

The counter-poise car, which, in the northern hemisphere, starts from the most northerly point of the track, is not provided with a duplicate of the hook M'. The lock-bar $x'$, on the car, is tripped at the terminus of the arc of rotation, by a suitable tripping bar, releasing the car from the cable; and immediately thereafter the spring $z'$ automatically engages the lock-bar $x'$ with a detent corresponding to the detent R.

The reflectors may be mounted as follows: The rod $c^7$, shown in Fig. 7, is a cranked or bent shaft or axis, suitably supported in the frames H shown in Figs. 1, 2, 3, 5. The reflectors, with their cases, are held in holders $M^2$ composed of crossed arms, the ends $o'$ of three of which are bent inward, to receive and hold the reflector cases, while the remaining arm has, removably connected to its outer end, an angular plate or clasp K', for the same purpose, said inbent proportions $o'$ and said angular plate or clamp having apertures $o^2$, to receive set-screws to properly secure the reflector-cases therein. The angular plate or clamp K' is removable, on the withdrawal of its screws $f'$, to permit the placing of the reflector, with its case, under the inbent portion of the arms of the holder $M^2$, as well as under the in-turned portion of the angular plate or clamp K'. Counteracting screws (not shown) are also applied to the arms of the reflector-holder $M^2$, to correct any inaccuracies in the construction of the holder or of the stud. The holder is fastened, at its center, to a shouldered projection or stud $a^{90}$, fitting into and pivoted to the bifurcated end of a screw-ended rod or bolt $a^7$ bolted to the cranked shaft or axis $c^7$, the parts being so fitted together as to permit the holder to be adjusted laterally at the required angle. As shown in Fig. 5, a series of shafts or axes is employed, arranged in a horizontal position, each shaft or axis carrying a series or tier of reflectors, and from the shafts or axes extend links or arms, $a^5$, $c^5$, $g^5$, &c., rigidly connected therewith and pivoted to the bars W. Upon one of said axes is secured a gear-wheel $y'$, geared to a small pinion $r'$, to whose shaft is applied a handle $v'$, by which the whole series of shafts and their several series of reflectors, are simultaneously actuated.

A', $A^2$, $A^3$, $A^4$, represent barrels or drums, having pawl and ratchet connections with a common shaft or axis $a^5$; and upon them are wound cords $c'$, $c^2$, $c^3$, $c^4$, carrying weights B', $B^2$, $B^3$, $B^4$, respectively. The shaft or axis $a^5$ is connected by a train of gear-wheels (not shown) with the windlass J, which drives the cable K. D', $D^2$, $D^3$, are movable shelves, for the temporary support of the weights $B^2$, $B^3$, $B^4$, hinged, at K', $K^2$, $K^3$, upon the uprights of a suitable frame-work. The unhinged or free ends of the shelves are supported upon slides, F', $F^2$, $F^3$, respectively, movable in ways or passages in said uprights, and connected to cords G', $G^2$, $G^3$, fastened, respectively, at their lower ends, to levers, H', $H^2$, $H^3$, suitably pivoted to such uprights, said levers being in alignment with, and adapted to be acted upon by, the weights, as the latter reach their points of maximum descent. As the weights successively reach their lowest point of descent, the levers withdraw the slides and permit the other weights successively to descend and unwind their cords from their respective drums, causing each drum, in its turn to rotate the common shaft $a^5$ and thereby the windlass J.

The first adjustment of the horizontal inclination of the reflectors is to be effected as follows: The track having been accurately laid, with the required radius (say fifty feet) and the position of the center fixed, so adjust the central reflector that a vertical plane passing through the sun at midday shall bisect this reflector, at right angles, the planes of all the reflectors of that series or tier being in, or parallel to, the plane of the central reflector. Then rotate the common axis of this series of reflectors until the central mirror reflects the rays of the sun upon a rod erected at the center of the circle, of which the track is an arc and perpendicuar thereto. Prepare a large scale drawing, exhibiting all the reflectors in the middle series, and also the rod at the center of the circle, as represented in Fig. 7, wherein, for convenience is shown only a single series of three reflectors. The vertical planes of incidence and reflection of the sun's rays will then both coincide, on the drawings, with the vertical plane O $D^5$. The sun's rays being, at a given instant of time, all parallel, draw $E^5 F^5$ and $G^5 H^5$, (Fig. 7) from the middle of each reflector in the horizontal series or tier containing the central reflector, parallel with O $D^5$. Draw lines $E^5 K^5$, and $G^5 N^5$, bisecting the angles O $E^5 F^5$ and O $G^5 H^5$, and draw the middle horizontal lines of the respective reflectors perpendicular to these bisecting lines. The drawing will then represent all the deflectors of the middle series or tier, in such positions as to reflect the sun's rays, in a sufficiently limited field, upon the rod at the center of the circle. The reflectors of that series are then to be rigidly fixed to their common axis, or shaft, in the respective angular positions shown on the scale-drawing. All the reflectors of the several series, in each frame, are, in like manner, so adjusted as to reflect the sun's rays upon the vertical rod at the center of the circle, simultaneously with the central reflector of the middle series. The adjustment of the horizontal inclination of all the reflectors to the vertical rod at the center is then complete. If the work has been accurately done, no further adjustment of this inclination will be necessary.

The adjustment of the vertical inclination of the reflectors to the heat-receiver is made as follows: The arms or links $a^{19}$, $c^5$, $g^5$, &c., which are rigidly attached to the common axes of the several series of reflectors, are all to be pivoted, as shown in Fig. 5, to the rod W. The link or crank arm $n^5$ rigidly connected with the gear-wheel $y'$, is also to be pivoted to the rod W, so that, when the crank $v'$ is suitably operated, uniform changes in the inclination of the several mirrors may be effected. This is accomplished as follows: The car being on the track, in such a position that a vertical plane passing through the sun bisects the central reflector at right angles, rotate the axis of the series or tier of reflectors to which the central reflector is attached, until this reflector reflects the sun's rays upon the heat-receiver; all the reflectors of the same tier will then reflect the sun's rays upon the heat receiver, in a sufficiently limited field, if their connection with the common axis has been accurately made. Moving the car along the track, so as to keep the image of the sun, which is reflected by the central reflector, constantly on the heat-receiver, where it must remain until the adjustment is consummated, correct any inaccuracies in the attachment of the reflectors of this series to their common axis. The rod W, being made temporarily immovable, pivot upon it the arm of this common axis, without moving the reflectors. Then move the arms of the other axes in the same mirror-frame, in succession, until all the reflectors in the frame reflect the sun's rays upon the heat-receiver, and pivot their respective arms upon the bar W, correcting any inaccuracies in the angles at which the individual reflectors may have been fastened to the axis, and keeping the reflection of the central reflector mean-time constantly upon the heat-receiver. Then pivot the crank arm or link $n^5$ to the rod W, and the adjustment for this frame of reflectors is completed.

For the other frames of reflectors, if more than one be used, the adjustment will be made in a similar manner so that when the central reflector of the middle frame reflects the sun's rays upon the heat-receiver, all the reflectors of all the frames will reflect the sun's rays in a sufficiently limited field, upon the heat-receiver; but, inasmuch as the sun has an apparent motion to and fro between the tropics each year, through an arc amounting, in 1893, to forty-six degrees fifty-four minutes twenty-three seconds, its apparent altitude changes slightly each day, and it becomes necessary, before commencing the day's work, slightly to elevate or depress the rod W and the arms which it moves. The extent of this elevation or depression may be determined, in each case, by observation or trigonometrical calculation, for the distance between the mirrors and the heat-receiver.

Instead of operating the reflector car by hand, it may be desirable to effect its rotary movement by means of a weight, or of several weights, arranged like clock-weights, in order to secure a constant force and a uniform movement of the reflectors. To effect this, the reflector car should be balanced, as nearly as possible, on the track by a counterpoise car loaded or ballasted with iron, stone, earth or other heavy material. This may be done as follows:—When the reflector car starts downward from the initial point of the arc of revolution, a ballasted or counter poise car, attached to the cable, starts upward from the middle of the arc of revolution. When the reflector car reaches the middle of the arc, the counterpoise car is disengaged from the cable by means hereinbefore described, or by some other equivalent device. At the same instant a second ballasted or counter poise car, previously stationed and held, by a detent, at the initial point of the arc of rotation, is automatically released and attached to the cable and started downward toward the middle of the arc, where it arrives at the instant when the reflector car arrives at the end of the arc. One of the means, by which this latter counterpoise-car may be automatically connected with the cable, at the commencement of the arc of rotation, and the lock-bar simultaneously released, so as to start the car, is shown in Fig. 4.

To move the cars, a single weight, attached to a cord passed around a revolving barrel, with pendulum regulation, as in clock-work, may suffice, or several weights may be required according to the circumstances. Suppose the radius of the track to be large (say one hundred feet) and the several cars to be of great weight. It may not be practicable to suspend, for their movement, a single sufficient weight, at a sufficient elevation. In that case several weights may be employed, suspended from several barrels, having pawl and ratchet connections with a common shaft, as hereinbefore explained, each weight, just as its own work ends, automatically bringing into operation a succeeding weight. To regulate the movement a pendulum of any of the most approved forms may be employed. I do not confine myself however, to the use of weights for the movement of the cars, or to the use of a pendulum for regulating the movement. Steam, water, electric, or other power may be employed, or the movement may be effected and regulated by hand, by means of a train of gear-wheels, or, if not effected by hand, may be regulated by hand, by means of conical pulleys, or otherwise.

Prior to the commencement of the work, in the morning, the second counterpoise car and the reflector car are moved back to the initial point of the arc of rotation, and the other counterpoise car is moved back to the middle point of the arc.

Another mode of moving the reflector car on the track is this: A train of gear-wheels is connected with the windlass greatly multiplying the power, and giving a slow motion to the reflector car. An operator actuates the gear-wheels by a crank, and, with his eye on the heat-receiver, easily keeps the focused rays in the proper place during the day. In this way, a single operator, with the aid of the counterpoise cars, easily moves a car bearing a great number of reflectors.

I do not restict my claims to any of these modes of operation, but claim the mode herein described of utilizing solar heat, whether the reflector-car is rotated in one or another of the modes herein disclosed, or in any other equivalent mode.

When the reflector-car and its counterpoise-car are of great weight, it may be convenient to resist the downward stress of the cars by brakes, applied at the commencement of the arc of rotation and automatically removed at the middle thereof, or by brakes so adjusted as to alternately increase and diminish the friction, at different stages of the movement of the reflectors, thus counteracting the effects of the changes of direction on the downward stress of the cars.

I claim—

1. In mechanism for utilizing solar heat for industrial purposes, the combination of a group of reflectors, supported in a frame having its plane perpendicular to the proximate plane of the sun's apparent diurnal revolution around the earth; a car supporting said reflectors and traveling through an arc of a circle, in a plane parallel to the proximate plane of the sun's apparent diurnal movement around the earth; a heat-receiver located in a line passing through the center of a circle of which the track of the reflector car is an arc and being perpendicular to the plane of rotation; and means to effect the rotary movement of the reflectors and their adjustment, so as to cause the reflectors constantly to reflect the sun's rays upon the heat-receiver, substantially as set forth.

2. In mechanism for utilizing solar heat for industrial purposes, the combination of a group of plane reflectors; their car traveling upon a circular track in a plane parallel to the proximate plane of the sun's apparent diurnal movement around the earth; and means for moving the car, with its reflectors, comprising a weight or series of weights, suspended from one or more barrels or drums, adapted to connect with a windlass driving the cable operating the car, substantially as set forth.

3. In mechanism for utilizing solar heat for industrial purposes, the combination of a group of reflectors; their car having a rotary movement; a weight actuating a drum or barrel driving the windlass which operates the cable of the car; and a pendulum for regulating said movement, substantially as set forth.

4. In mechanism for utilizing solar heat for industrial purposes, the combination of a series or tier of reflectors and their shaft or axis, said reflectors having tongued projections, at the rear, pivoted and fitting in bifurcated studs secured in said shaft or axis, substantially as specified.

5. In mechanism for utilizing solar heat for industrial purposes, the combination of several tiers or series of reflectors; a series of shafts or axes carrying said reflectors; rods having a link, or arm, connection with said series of shafts or axes; and a handle carried by a pinion geared to one of said shafts, substantially as specified.

6. In mechanism for utilizing solar heat for industrial purposes, the combination of a reflector-car, adapted to travel upon a circular sloping track, and a counter-poise car, adapted to co-act with said reflector-car, substantially as specified.

7. In mechanism for utilizing solar heat for industrial purposes, the combination of a reflector-car, traveling upon a sloping circular track, and means for operating said car, comprising a weight, with or without clock-work regulation, and a counterpoise-car adapted to co-act with said reflector-car, substantially as set forth.

8. In mechanism for utilizing solar heat for industrial purposes, the combination of a car carrying reflectors for reflecting the sun's rays, and a track in the form of an arc of a circle laid in a plane parallel to the proximate plane of the sun's apparent diurnal movement around the earth, substantially as set forth.

9. In mechanism for utilizing solar heat for industrial purposes, the reflector-car having two surfaces or platforms at right angles with each other, and the means for its retention upon its track, substantially as set forth.

10. In mechanism for utilizing solar heat for industrial purposes, the reflector-car having two surfaces or platforms at right angles with each other, and having axles attached to each platform, each axle carrying a series of wheels, traveling upon their respective rails in different angular positions, substantially as set forth.

11. In mechanism for utilizing solar heat for industrial purposes, the combination of a counterpoise car and its track; a lock-bar hung upon the car, and having a lateral projection to engage a detent or stop on the track; and means to effect the locking and unlocking of said lock-bar, substantially as set forth.

12. In mechanism for utilizing solar heat for industrial purposes, the counterpoise-car having, attached thereto, the lock-bar adapted to engage a detent or stop on the track, and pressed by a spring, and acted upon by a ball or shoulder upon the cable, substantially as specified.

13. In mechanism for utilizing solar heat for industrial purposes, the combination of the mirror-car; the cable; the track having drums; and the windlass driving said cable, the cable moving the car and encompassing the drums, substantially as described.

14. In mechanism for utilizing solar heat for industrial purposes, the combination of the cable for actuating the car; the series of weights, adapted automatically to make each other successively operative; and the windlass geared to and actuated by the common shaft driven by said weights, substantially as set forth.

15. In mechanism for utilizing solar heat for industrial purposes, the combination of the shaft, geared to transmit motion to the windlass actuating the cable; the drums or barrels having pawl and ratchet connections with said shaft; the suspended weights; the hinged or pivoted shelves or supports, for said weights; and the slides supporting said shelves at their free ends, and connected with levers arranged in alignment with, and adapted to be acted upon, by said weights, at or near their lowest point of descent, substantially as specified.

16. In mechanism for utilizing solar heat for industrial purposes, the reflector-case-holders having several arms provided, respectively, at their extremities, with clasps furnished with set screws or holding screws, one of said clasps being removable, substantially as set forth.

17. In mechanism for utilizing solar heat for industrial purposes, the combination of the reflector-case-holder, whose several arms are provided with clasps, at the outer ends; and the reflector, with its air-tight case, substantially as set forth.

In testimony whereof I affix my signature in presence of two witnesses.

HALBERT E. PAINE.

Witnesses:
LIZZIE CATLETT,
THOS. S. HOPKINS.